United States Patent
Mialhe et al.

(12) 
(10) Patent No.: US 9,999,940 B2
(45) Date of Patent: Jun. 19, 2018

(54) PROCESS AND SYSTEM FOR FRICTION STIR WELDING OF A STIFFENER ON AN AIRCRAFT PANEL

(71) Applicant: AIRBUS OPERATIONS (S.A.S.), Toulouse (FR)

(72) Inventors: Christophe Mialhe, Giroussens (FR); Patrick Lieven, Fronton (FR); Romain Delahaye, Colomiers (FR)

(73) Assignee: Airbus Operations (S.A.S.), Toulouse (FR)

(*) Notice: Subject to any disclaimer, the term of this patent is extended or adjusted under 35 U.S.C. 154(b) by 0 days. days.

(21) Appl. No.: 14/015,103

(22) Filed: Aug. 30, 2013

(65) Prior Publication Data
US 2014/0069987 A1    Mar. 13, 2014

(30) Foreign Application Priority Data
Sep. 7, 2012 (FR) ..................................... 12 58392

(51) Int. Cl.
*B23K 20/12* (2006.01)

(52) U.S. Cl.
CPC .......... *B23K 20/122* (2013.01); *B23K 20/126* (2013.01); *B23K 20/1245* (2013.01); *B23K 20/1255* (2013.01); *B23K 20/1265* (2013.01)

(58) Field of Classification Search
None
See application file for complete search history.

(56) References Cited

U.S. PATENT DOCUMENTS

| | | | | |
|---|---|---|---|---|
| 6,070,784 A * | 6/2000 | Holt et al. | ................ | 228/112.1 |
| 6,237,835 B1 | 5/2001 | Litwinski et al. | | |
| 6,419,142 B1 * | 7/2002 | Larsson | ........................ | 228/2.1 |
| 6,460,752 B1 | 10/2002 | Waldron et al. | | |
| 6,779,707 B2 * | 8/2004 | Dracup et al. | ............. | 228/112.1 |
| 7,028,880 B2 | 4/2006 | Narita et al. | | |
| 8,056,797 B2 * | 11/2011 | Packer et al. | .................. | 228/50 |
| 8,356,772 B2 * | 1/2013 | Bense et al. | ................. | 244/131 |
| 9,517,529 B2 | 12/2016 | Mialhe et al. | | |

(Continued)

FOREIGN PATENT DOCUMENTS

DE    10 2008/044087    5/2010
EP        1 864 747    12/2007

(Continued)

OTHER PUBLICATIONS

Extended European Search Report for Application No. 131881474, dated Mar. 19, 2014.

(Continued)

*Primary Examiner* — Devang R Patel
(74) *Attorney, Agent, or Firm* — Jenkins, Wilson, Taylor & Hunt, P.A.

(57) ABSTRACT

Process for linear transparency friction stir welding of a flange of a stiffener onto at least one panel for an aircraft, wherein a weld bead is made along the flange of the stiffener and wherein the weld bead extends in cross-section from a first lateral edge to an opposite second lateral edge of the stiffener flange. System for the implementation of the above welding process, which includes three welding heads arranged as a triangle, each of which includes a rotating pin as well as a shoulder extending at the base of said rotating pin.

11 Claims, 8 Drawing Sheets

(56) References Cited

U.S. PATENT DOCUMENTS

| | | | |
|---|---|---|---|
| 2001/0040179 | A1 | 11/2001 | Tochigi et al. |
| 2005/0139640 | A1* | 6/2005 | Kay ............................ 228/112.1 |
| 2006/0191979 | A1* | 8/2006 | Lohwasser ................. 228/112.1 |
| 2007/0138236 | A1* | 6/2007 | Agarwal .............. B23K 20/128 |
| | | | 228/112.1 |
| 2007/0187466 | A1 | 8/2007 | Sayama et al. |
| 2008/0296433 | A1* | 12/2008 | Brenner .................... B64C 1/12 |
| | | | 244/129.1 |
| 2008/0308610 | A1* | 12/2008 | Watson ................ B23K 20/122 |
| | | | 228/112.1 |
| 2009/0200423 | A1* | 8/2009 | Tucker ...................... B64C 3/18 |
| | | | 244/123.1 |
| 2009/0311549 | A1* | 12/2009 | Fernandez ......... B23K 20/1255 |
| | | | 428/594 |
| 2011/0268494 | A1 | 11/2011 | Marco et al. |
| 2012/0228272 | A1 | 9/2012 | Carlson et al. |
| 2013/0206817 | A1 | 8/2013 | Tavares et al. |
| 2013/0256457 | A1* | 10/2013 | Goehlich ..................... 244/120 |
| 2014/0069984 | A1 | 3/2014 | Mialhe et al. |
| 2017/0066077 | A1 | 3/2017 | Mialhe |

FOREIGN PATENT DOCUMENTS

| | | |
|---|---|---|
| JP | H10-52772 | 2/1998 |
| JP | H11-28581 | 2/1999 |
| JP | H11-47959 | 2/1999 |
| JP | 2004-017128 | 1/2004 |

OTHER PUBLICATIONS

French Search Report for Application No. FR 1258393 dated May 24, 2013.

French Search Report for Application No. FR 1258392 dated May 27, 2013.

Restriction Requirement for U.S. Appl. No. 14/015,083 dated Mar. 3, 2015.

Non-Final Office Action for U.S. Appl. No. 14/015,083 dated May 28, 2015.

Final Office Action for U.S. Appl. No. 14/015,083 dated Jan. 6, 2016.

Notice of Allowance for U.S. Appl. No. 14/015,083 dated Aug. 12, 2016.

\* cited by examiner

PROCESS AND SYSTEM FOR FRICTION STIR WELDING OF A STIFFENER ON AN AIRCRAFT PANEL

TECHNICAL FIELD

The present invention concerns the fixing of stiffeners on aircraft panels, in particular panels of aeroplanes.

The panels concerned by the invention may be fuselage panels, wing surface panels or tail assembly panels, or yet again panels which form part of a storage tank or a landing gear compartment, or any other type of panel.

The stiffeners fixed to these panels may in particular be fuselage circumferential frames, fuselage longitudinal stringers or stiffeners, wing surface or tail assembly spars or ribs, floor cross-members or floor rails etc.

BACKGROUND

Fixing of stiffeners onto panels in aircraft is generally achieved by riveting.

In order to reduce the time and cost of operations for fixing stiffeners onto corresponding panels, other techniques are envisaged including in particular the so-called friction stir welding technique.

The technique referred to as friction stir welding (FSW) is known, in general, for making fast durable mechanical joints which allow forces to pass between assembled parts with an efficiency which is at least equivalent to that achieved using a conventional riveted joint.

This technique, shown schematically in FIG. 1, uses a welding device which includes at least one welding head 10, which includes a rotating pin 12 and a shoulder 14 which extends to the base of the rotating pin 12 and which has a diameter which is typically equal to 2 to 2.5 times the mean diameter of this rotating pin 12.

Friction stir welding of two parts 16a, 16b involves introducing the rotating pin 12 into the two parts at the joint interface 18 between them until the shoulder 14 makes contact with the surface of each of the parts 16a, 16b. This introduction of the rotating pin 12 into the material making up the parts 16a, 16b, is made possible by local softening of this material as a result of the heating produced by the friction of the rotating pin 12 against the two parts 16a and 16b. The dough-like state of the material of the parts 16a, 16b around the rotating pin 12 then allows this rotating pin to move along the joint interface 18. The rotation of the rotating pin 12 as well as, if appropriate, that of the shoulder 14, causes stirring of the material in the dough-like state.

The extrusion caused by the rotating pin 12 and the forging effect produced by the shoulder 14 thus gradually results in the formation of a weld bead. This weld bead takes the form of a new metallurgical structure common to the two materials, formed as a result of recovery-recrystallization phenomena, which thus guarantees good cohesion of the two parts 16a, 16b after cooling.

As shown schematically in FIG. 2, a counter-pressure is applied on the face of each part 16a, 16b opposite the welding head 10, using a counter-form 20, in order to counteract the pressure exerted by the rotating pin 12. Such a counter-form sometimes incorporates a cooling device which allows part of the heat generated by the friction to be removed. This, in general, improves the mechanical properties of the parts after welding. Such a cooling device takes the form, for example, of channels 21 incorporated in the counter-form 20 and in which a heat-transfer fluid flows.

The friction stir welding technique allows so-called "butt" welding to be carried out, as shown in FIGS. 1 and 2, wherein the axis of the rotating pin 12 is locally parallel to the joint interface between the parts to be assembled.

This technique also allows so-called "transparency" welding to be carried out, in which the axis of the rotating pin 12 is locally orthogonal to the joint interface between the parts to be assembled. In this case one of the parts to be assembled is interposed between the welding head and the other part to be assembled.

The friction stir welding technique in particular exhibits the advantage of being carried out below the melting point of the constituent material of the parts to be assembled, which in particular avoids problems associated with re-solidification which usually occur with other welding techniques.

This technique in addition offers the advantage of not requiring any filler materials, and of not causing any emission of polluting fumes.

Furthermore the speed at which the welding device moves along the joint interface of the parts to be assembled may reach 2 meters per minute, so that this welding technique allows parts to be assembled quickly and at reduced cost.

This welding technique in addition offers possibilities for high levels of automation.

The application of this welding technique to the assembly of stiffeners and of aircraft panels poses a problem however.

In effect, in the conventional assembly of a stiffener and of an aircraft panel, a layer of mastic is usually placed between the stiffener and the panel, in order, in particular, to provide a seal between these elements and thus limit the risk of corrosion of these elements, and also in order to minimise wear phenomena resulting from the vibrations between the stiffener and the aircraft panel.

In the case of the friction stir welding technique, although the problem of vibrations may be less marked than that encountered with the riveted method of assembly, on the other hand the problem relating to the seal between the assembled parts persists.

This problem of the seal is illustrated in FIGS. 3, 3a and 3b.

FIG. 3 is a partial diagrammatic view in longitudinal section of a circumferential frame 22 fixed to an aircraft fuselage panel 24 by a transparency friction stir welding process of a known type, with no use of mastic placed between the assembled parts.

FIG. 3a shows on a larger scale the joint between the flange 26 of the circumferential frame 22 and the fuselage panel 24 in the case of welding using two weld beads 28 relatively close to the web 30 of the circumferential frame 22.

FIG. 3b is a similar view to FIG. 3a, illustrating the case of a weld using two weld beads 28 which are relatively far away from the web 30 of the circumferential frame 22 and respectively close to the opposite edges 32a and 32b of the flange 26 of this circumferential frame 22.

In both cases the method of assembly does not prevent the appearance of micro-cavities 34 whose dimensions are exaggerated in these figures for the purposes of clarity. Such micro-cavities, widely referred to as "corrosion traps", allow moisture to penetrate the joint between the parts and thus promote the corrosion of these parts.

In the case of friction stir welding, interposing a layer of mastic between a stiffener and an aircraft panels is not desirable, since the mastic mixes with the material constituting the stiffener and the panels during welding, resulting in a reduction in the structural qualities of the welded assembly.

This problem naturally occurs when the width of the flange to be welded is greater than the width of the footprint of the rotating pin in this flange, that is, greater than the diameter of the rotating pin and in particular when the width of the flange is greater than double the diameter of the rotating pin.

SUMMARY

One aim of the invention is notably to provide a simple, economic and efficient solution to this problem.

It aims in particular to offer a process for welding stiffeners onto aircraft panels which has the advantages of friction stir welding in terms of assembly quality, speed and low cost, whilst minimising the risk of corrosion of assembled parts and whilst allowing these parts to retain their optimum structural properties.

To this end the invention proposes a linear transparency friction stir welding (FSW) process for welding the flange of a stiffener onto at least one aircraft panel, in which a weld bead is made along said stiffener flange using at least one rotating pin, and in which the width of said flange of said stiffener is greater than a maximum diameter of said rotating pin.

According to the invention said weld bead extends in cross-section from a first side edge to a second opposite side edge of said stiffener flange.

The term "maximum diameter" must be understood as meaning the diameter of the cross-section of the pin where this pin is widest. The pin may in effect possess a form such that the diameter of its transverse section varies, for example a tapered cylinder or conical form.

The process according to the invention is in effect useful when the width of the stiffener flange is greater than the maximum diameter of the rotating pin, in particular when the width of the stiffener flange is greater than double the maximum diameter of the rotating pin.

The welding process according to the invention prevents the appearance of micro-cavities between the stiffener flange and the panel, thus reducing the risk of corrosion of these parts.

This process therefore also removes the need for a layer of mastic interposed between the stiffener flange and the panel, and thus avoids the problems of contamination of material inherent in the use of such a layer of mastic in the context of the friction stir welding technique.

This means that the stiffener flange is preferably pressed directly against the panel.

The cohesion of the assembly obtained as a result of the process according to the invention may thus be optimised.

In general the invention therefore offers an optimised method of using the friction stir welding technique for assembling stiffeners and panels for aircraft.

The invention therefore offers the advantages inherent in the friction stir welding technique, in particular in terms of speed and of possibilities for automation.

The stiffener concerned by the process according to the invention typically includes a web which is connected to the stiffener flange and which extends orthogonally to this flange, or in a manner which is inclined in relation to said flange, for example in the case of a stiffener intended to be incorporated in a nose cone or tail cone of an aircraft.

The process according to the invention includes in general terms the application of the stiffener flange onto a first surface of said panel and the application of at least one welding head onto a second surface of said panel, opposite the first said surface, as well as moving this welding head along the stiffener flange so as to generate heat by friction and thus locally produce softening of the material forming the panel and of the material forming the stiffener flange, from the first lateral edge to the second lateral edge of this flange.

The process naturally includes the application of counter-bearing means onto the stiffener flange to counteract the pressure exerted by the aforementioned welding head. Examples of such counter-bearing means will be described in more detail in what is to follow.

Because the welding process according to the invention involves transparency welding, the weld bead extends in the direction of the thickness, starting from said second surface of the panel. Furthermore, in order to promote structural homogeneity of the stiffener flange at the end of the welding process, the weld bead preferably extends over a major portion of the thickness of the stiffener flange.

The stiffener flange may be welded jointly to two adjacent panels.

The process therefore jointly performs both butt welding of the two panels and transparency welding of the stiffener flange onto the respective adjacent portions of the panels.

In general terms said panel may be a fuselage panel and said stiffener may be a circumferential frame or an angular segment of such a circumferential frame.

In this case the movement of each welding head is achieved along a curved trajectory.

The flange of such a circumferential frame exhibits, for example, a cylindrical revolution form, or a form which is a portion of a revolution cylinder.

In this case the movement of each welding head is achieved overall along a trajectory which is circular, or an arc of a circle, centred on a fuselage axis defined by said fuselage panel.

A fuselage panel for an aircraft exhibits an external surface which is defined as being the surface designed to be located on the external side of the aircraft and to be washed by the relative airflow flowing along the fuselage in flight, and an internal surface located on the opposite side. The aforementioned circumferential frame is, naturally, welded onto the internal surface of the fuselage panel.

In the case where the process involves welding such a circumferential frame onto two adjacent fuselage panels, the joint produced at the end of the process is of the type widely known as an "orbital joint".

Alternatively, said stiffener may be a longitudinal stiffener, also known as a stringer.

In this case the movement of each welding head may be carried out along a substantially rectilinear trajectory, in particular when the fuselage panel is intended for a length of fuselage section located between the nose cone and tail cone of an aircraft.

In yet another alternative the panel may be an aerodynamic panel of a wing-surface element of an aircraft such as an aircraft wing or tail assembly.

In this case the stiffener involved may be a spar or a rib of such an element of an aircraft.

In yet another alternative the panel may be a panel which forms part of the floor of an aircraft, in which case the stiffener may be a cross-member supporting such a floor or a rail for guiding seats to be fitted onto such a floor.

In yet another alternative the panel may form part of an aircraft landing-gear enclosure or form the base of a storage tank in an aircraft.

In general terms the process according to the invention preferably includes the use of a welding system which includes multiple welding heads, each of which includes a rotating pin as well as a shoulder extending at the base of the rotating pin, and which in addition includes a counter-bearing surface.

In this case this process includes on one hand inserting the respective rotating pins of said welding heads into said panel and into said stiffener flange, then movement of said welding heads along said stiffener flange in a direction of welding, allowed by local softening of the material forming the panel and of the material forming the stiffener flange caused by the heat produced by the friction of said rotating pins.

On the other hand, in conjunction with this insertion and movement of the rotation pins, the process includes the application of the support surface of the counter-bearing unit onto the stiffener flange in order to counteract the pressure exerted by said rotating pins.

The respective rotating pins of the welding heads are preferably mutually offset in a transverse direction which is orthogonal to the weld direction and to an axis of rotation of each of the rotating pins.

Preferentially the footprint formed by all the respective rotating pins of said welding heads substantially extends in cross-section from the first lateral edge to the second lateral edge of the stiffener flange.

The term "substantially" is to be understood as meaning that the footprint extends up to a distance of less than 0.2 mm from each lateral edge of the stiffener flange.

This guarantees that the weld bead obtained at the end of the process itself extends in cross-section from the first lateral edge to the second lateral edge of the stiffener flange.

The term "footprint" is to be understood as meaning the mark that would be produced in the material by inserting the rotating pins into this material independently of any stirring phenomena produced by the rotation of said pins.

It should be noted that the shoulder of each welding head may be static or rotating. In the last case the direction of rotation of the shoulder may be the same as that of the rotating pin of the same welding head, or may be in the opposite direction to that of said rotating pin in a configuration widely known as "Delta N".

Preferentially each of the rotating pins penetrates the flange of the stiffener to a depth which is 0.2 mm to 0.5 mm from the surface of the flange located on the side away from the welding heads.

This reduces the risk of the rotating pins making contact with said counter-bearing means, as will become clearer in what is to follow.

In the preferred embodiment of the invention said multiple welding heads include three welding heads arranged in a triangular configuration.

Such a configuration of welding heads is particularly well suited to the formation of weld beads which cover the entire width of the aircraft stiffener flanges.

In this case said multiple welding heads preferably include two lateral welding heads centred in relation to a given plane orthogonal to a direction of welding, as well as a central welding head offset in said direction of welding in relation to each of said lateral welding heads.

The term "direction of welding" is to be understood as meaning a direction tangential to the overall trajectory followed by each welding head. Such a direction is substantially orthogonal to the axis of rotation of each aforementioned rotating pin.

Preferentially the projection of the rotating pin of the central welding head in the direction of welding intercepts the respective rotating pins of the lateral welding heads.

This characteristic guarantees a certain degree of overlap between on the one hand the footprint of the rotating pin of the central welding head and on the other hand the respective footprints of the respective rotating pins of the lateral welding heads. This in particular optimises the homogeneity of the weld bead.

In the preferred embodiment of the invention a first of said welding heads is positioned facing a web of the stiffener whilst the other two welding heads are offset in relation to said stiffener web, and the rotating pin of said first welding head does not penetrate into said stiffener flange so deeply as the respective rotating pins of the other two welding heads.

This configuration reduces the risk of damage to the critical structural parts of the stiffener located close to the web of the latter.

In particular, said first welding head may be said central welding head.

This configuration is particularly suitable when the stiffener includes a web which is substantially central in relation to the flange of this stiffener.

In the preferred embodiment of the invention said welding heads move in a direction such that said central welding head is arranged to the rear of said lateral welding heads.

In general terms, other configurations of welding heads are possible for implementing the welding process according to the invention, insofar as these welding heads allow a weld bead to be obtained which covers the entire width of the stiffener flange concerned.

In addition, said support surface of the counter-bearing unit is advantageously formed jointly by two clamp rollers carried on the counter-bearing unit and which move by rolling against the stiffener web.

In general, such clamp rollers in particular offer the advantage of being able to incorporate a low-cost heat exchange device of simple design to allow effective cooling of the stiffener and of the panel during welding.

Alternatively, such cooling may be carried out by spraying coolant onto the welding zone, for example by means of an additional robot provided for this purpose, or by immersion of the entire welding installation in a tank filled with a heat-exchange fluid, all without leaving the scope of the invention.

Each of these clamp rollers advantageously have a shoulder pressed against a corresponding edge of the stiffener flange.

In addition these clamp rollers preferably sandwich a web of the stiffener.

Alternatively, the support surface of the counter-bearing unit may be formed of a static part, also known as a counter-form, all without leaving the scope of the present invention.

The invention also concerns a welding system for the implementation of a welding process of the type described above and which includes three welding heads arranged as a triangle, each of which includes a rotating pin as well as a shoulder extending at the base of the rotating pin.

Naturally this system exhibits the advantages described above relating to the process according to the invention, and may moreover exhibit one or more of the preferential characteristics described above.

Alternatively, other kind of welding systems may be used for implementing the welding process of the type described above.

BRIEF DESCRIPTION OF THE DRAWINGS

The invention will be more readily understood and other of its details, advantages and characteristics will appear on reading the following description, which is given as an example only and is in no way restrictive, whilst referring to the appended drawings, wherein.

In all these figures, identical references can designate identical or analogous elements.

DETAILED DESCRIPTION

Figure 1:
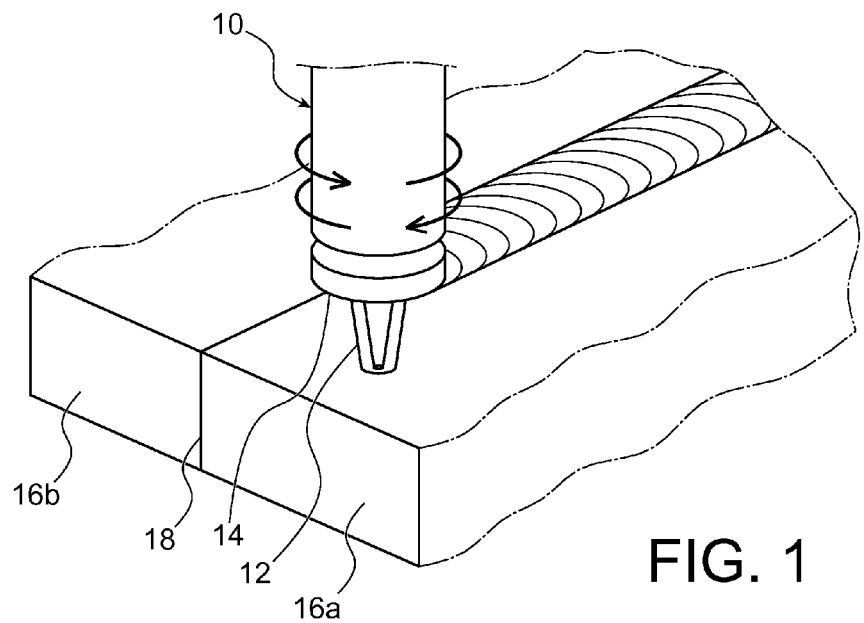
FIG. 1, which has already been described, is a partial perspective diagrammatic view of two parts being butt welded by a friction stir welding technique.
Figure 2:
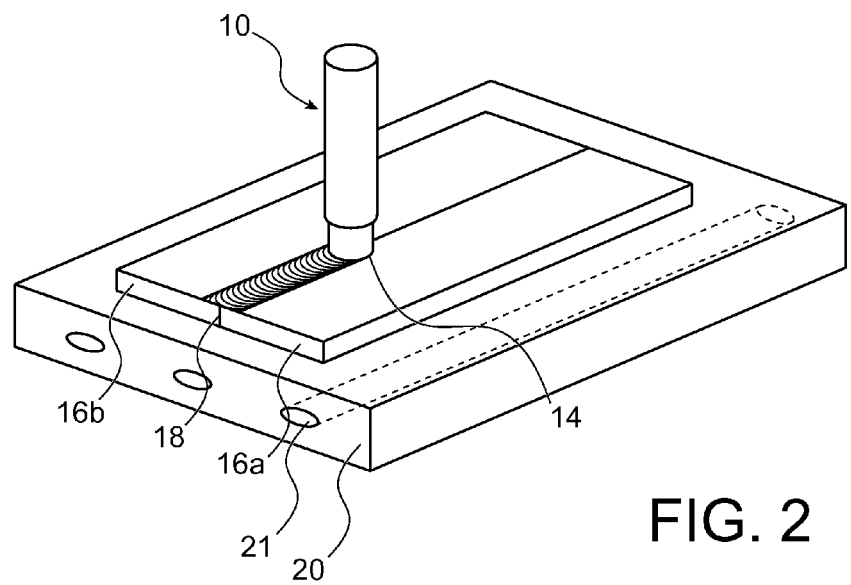
FIG. 2, which has already been described, is a perspective diagrammatic view of two parts being butt welded by a friction stir welding technique, also showing a counter-form for supporting both parts.
Figure 3:
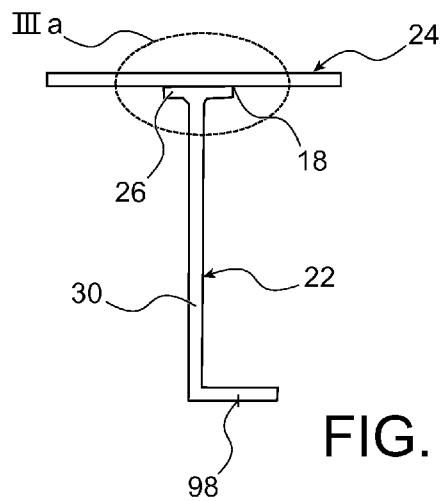
FIG. 3, which has already been described, is a longitudinal section diagrammatic view of a circumferential frame fixed onto an aircraft fuselage panel using a known type of friction stir welding technique.
Figure 3A:
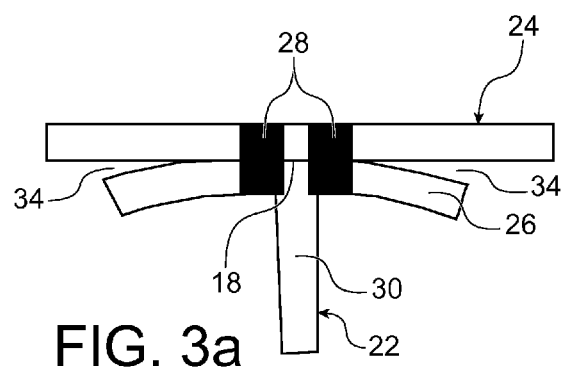
FIG. 3a is a larger-scale view of detail 111a of FIG. 3.
Figure 3B:
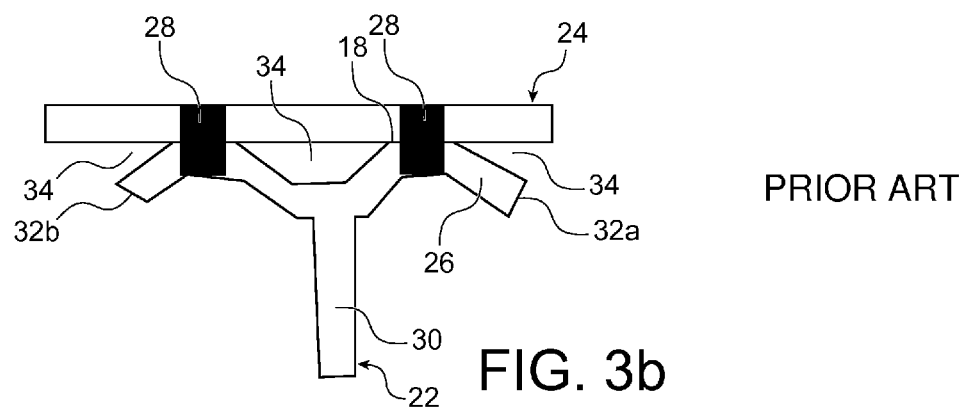
FIG. 3b is a similar view to FIG. 3a, of a circumferential frame fixed onto an aircraft fuselage panel using another known type of friction stir welding technique.
Figure 4:
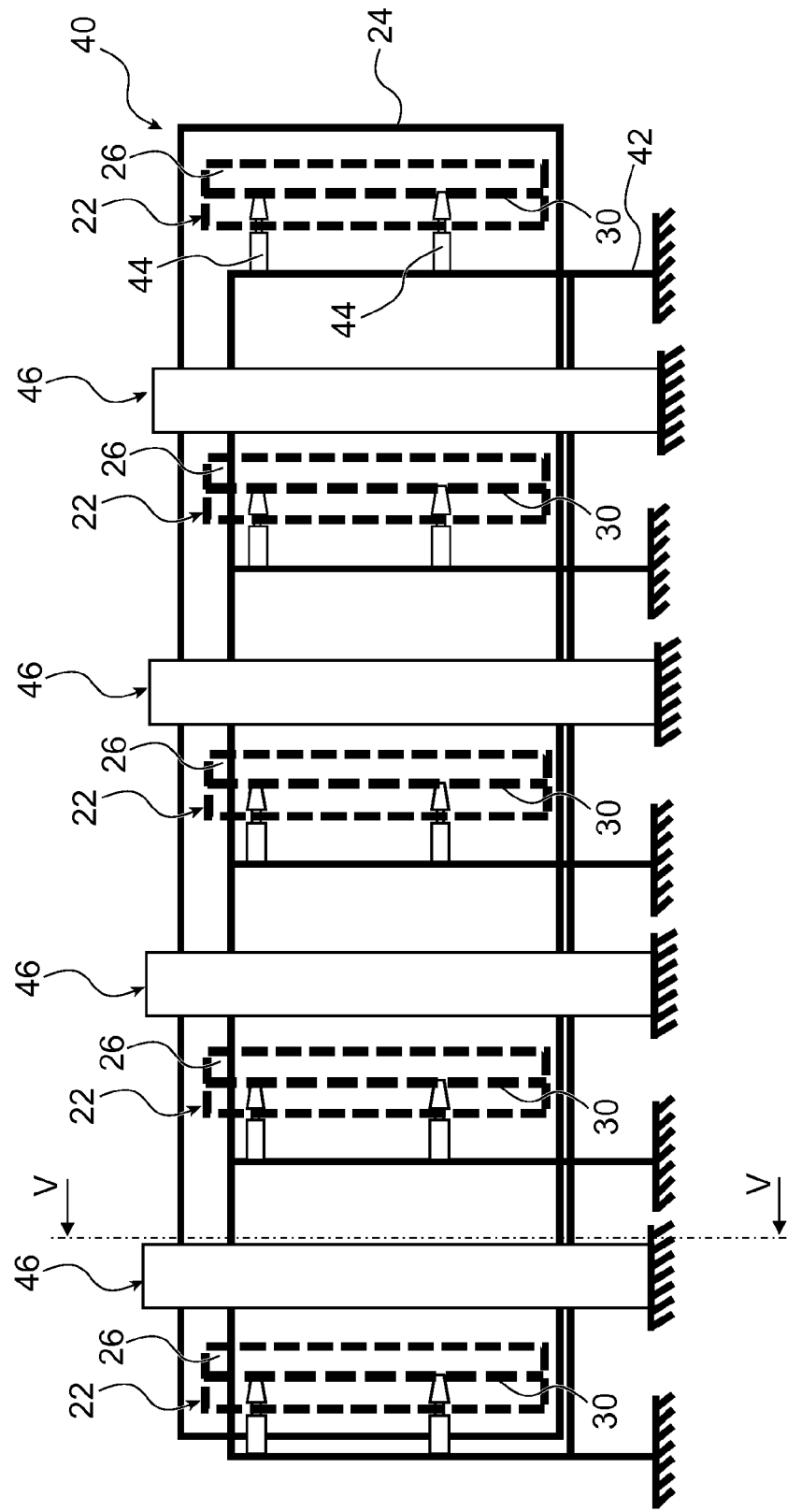
FIG. 4 is a diagrammatic side view of a welding installation including several welding systems according to a preferred embodiment of the invention for the assembly of aircraft circumferential frames and fuselage panels.

FIG. 4 shows a general view of a friction stir welding installation 40 designed to implement a transparency friction stir welding process for assembling circumferential frames onto aircraft fuselage panels, in accordance with a preferred embodiment of the invention.

This FIG. 4 in particular shows five circumferential frames 22 each of which is fixed to a support 42, for example by means of two centring pins 44 respectively passing into two centring holes in the circumferential frame 22, where the latter may be retained, for example, by means of pins which operate in conjunction with the centring pins 44.

A skin formed by an aircraft fuselage panel 24 is applied onto the external surface of the flange 26 of each of the circumferential frames 22.

In addition four welding systems 46 are arranged side-by-side opposite the support 42 which holds the circumferential frames 22 and the fuselage panel 24. For the purposes of clarity, the four welding systems 46 are shown longitudinally offset in relation to the circumferential frames 22, but during the operation of this welding installation 40 each of the welding systems 46 is arranged substantially facing a corresponding circumferential frame 22.

Figure 5:
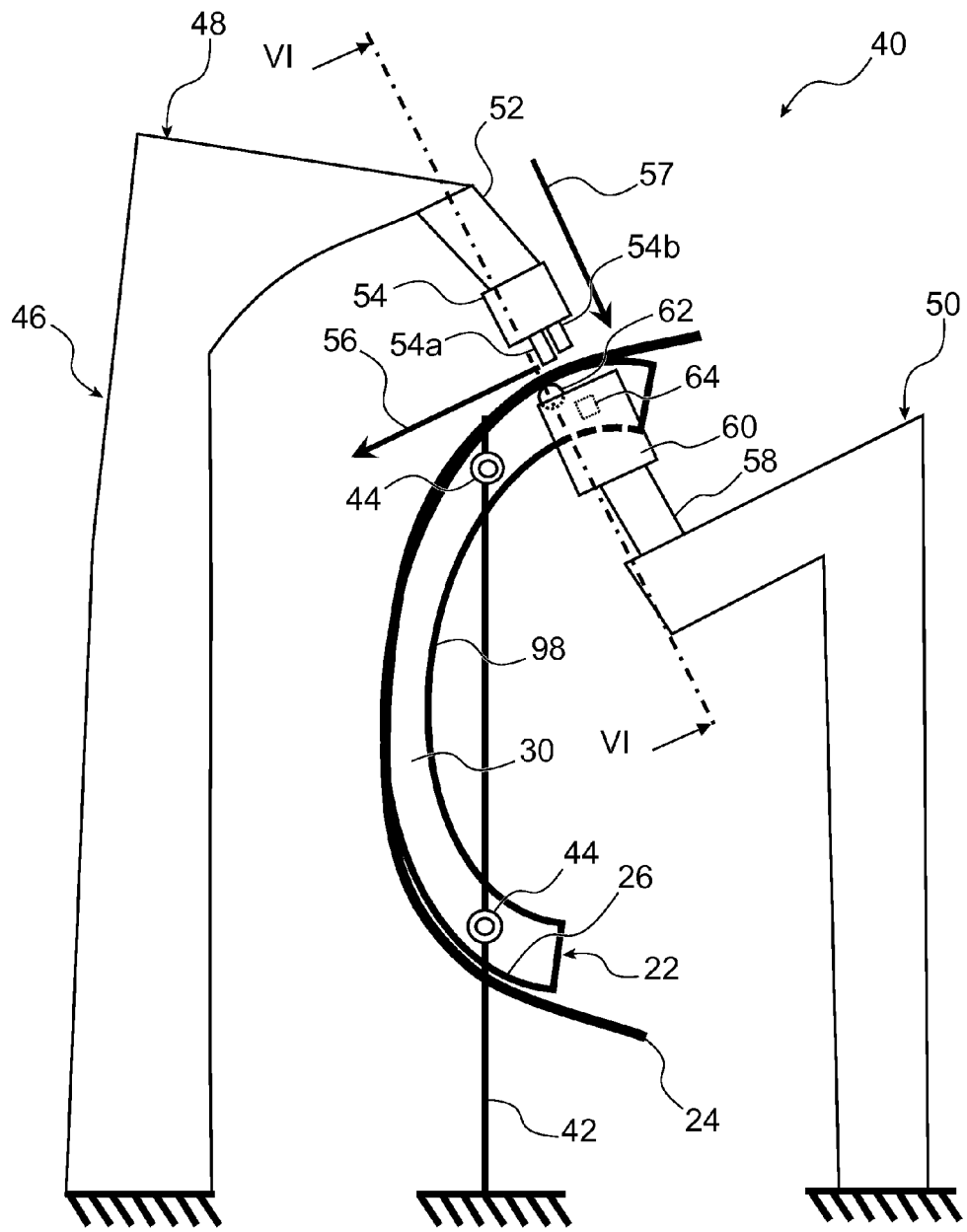
FIG. 5 is a transverse section diagrammatic view, along plane V-V of FIG. 4, of the welding installation in FIG. 4, showing a welding system belonging to this welding installation.

FIG. 5 shows the welding installation 40 in section along plane V-V of FIG. 4 and thus shows one of these welding systems 46 viewed from the side.

This welding system 46 overall includes a welding unit 48 and a counter support unit 50, arranged opposite each other on either side of the support 42 carrying the circumferential frames 22 and the fuselage panel 24.

The welding unit 48 takes the form of a robot which includes at one end of a robotic arm 52 a welding device 54 provided with multiple welding heads, as will become clearer in what is to follow.

The welding unit 48 is designed so as to allow, in particular, movement of the welding device 54 in the plane of FIG. 5 along the circumferential frame 22, along a local direction of welding 56 tangential to the fuselage panel 24.

The welding unit 48 is in addition designed so as to allow the welding device 54 to move in a direction in which the respective rotating pins of the welding heads of this welding device penetrate the material forming the fuselage panel 24 and the circumferential frame 22, as will become clearer in what is to follow. This penetration direction is represented by arrow 57 and is parallel to the line forming the intersection of the plane of FIG. 5 and of plane VI-VI that can be seen in FIG. 5. By definition this penetration direction 57 is normal to the external surface of the fuselage panels 24 and is therefore orthogonal to the aforementioned welding direction 56.

The counter-bearing unit 50 also takes the form of a robot equipped with a robotic arm 58. This latter has an extremity equipped with two support arms 60 arranged on either side of the web 30 of the circumferential frame 22, with only one of these support arms 60 being visible in FIG. 5. These support arms 60 each hold a clamp roller 62 as well as a guide roller 64, as will become clearer in what is to follow.

Figure 6:
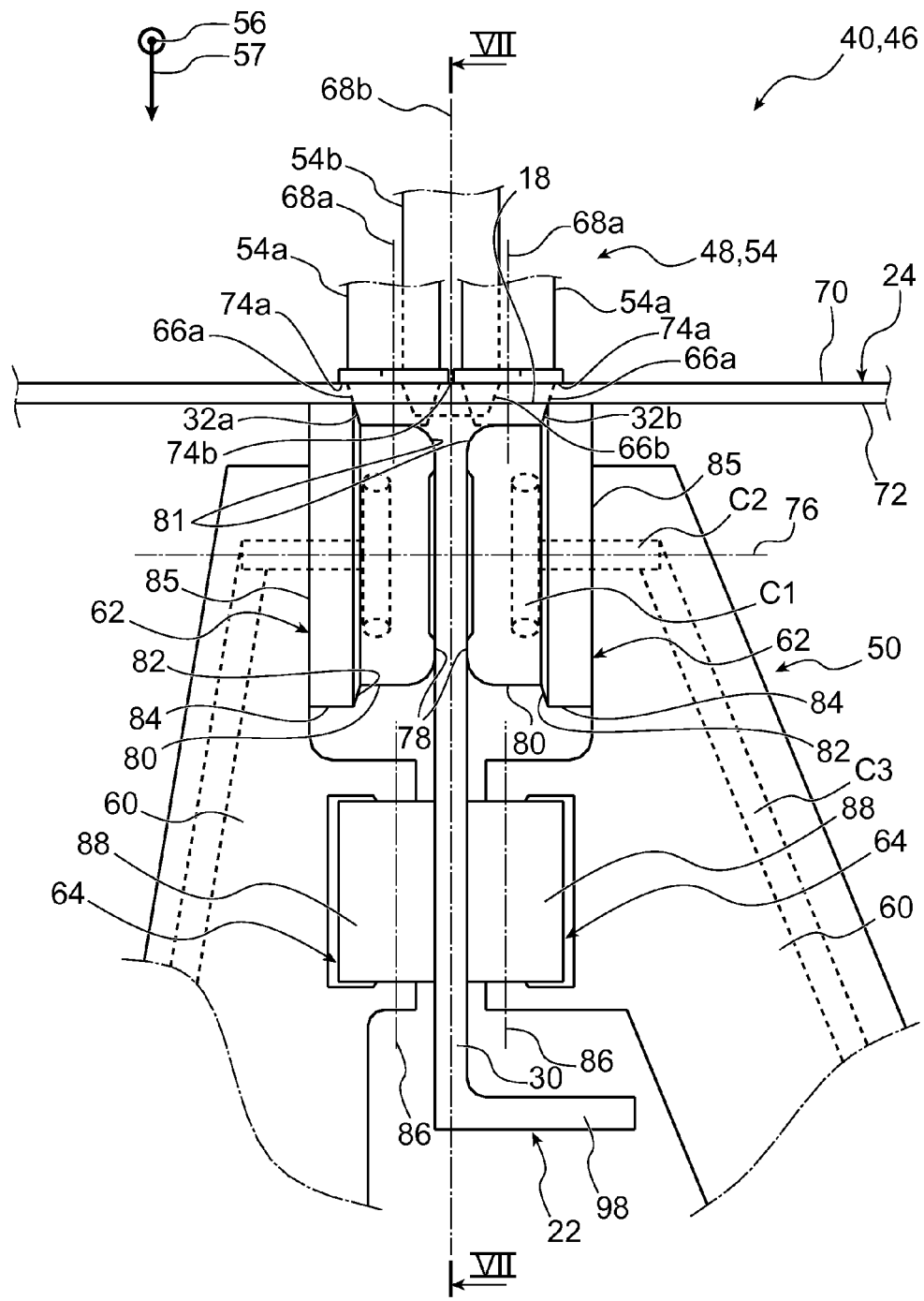
FIG. 6 is a partial diagrammatic view, on a larger scale and in longitudinal section along plane VI-VI of FIG. 5, of the welding system in FIG. 5.

FIG. 6 shows in greater detail the main elements used to implement the friction stir welding process using the welding installation 40.

As shown in this FIG. 6, the welding device 54 includes three welding heads arranged as a triangle (FIG. 6). These three welding heads are distributed as two lateral welding heads 54a and a central welding head 54b, where the latter is offset towards the rear relative to the lateral welding heads 54a (the rear being defined along the direction of welding 56), as is more clearly shown in FIG. 7.

Each of the three aforementioned welding heads 54a, 54b includes a rotating pin 66a, 66b (FIGS. 6 and 7), which rotates about a rotation axis 68a, 68b, which is substantially orthogonal to the direction of welding 56 and therefore also substantially normal to the external 70 and internal surfaces 72 of the fuselage panel 24. Each of the three welding heads 54a, 54b includes in addition a shoulder 74a, 74b formed at the base of the corresponding rotating pin 66a, 66b. This shoulder 74a, 74b can rotate in the same or opposite direction to the direction of rotation of the corresponding rotating pin 66a, 66b, or even be static, in a manner which is known per se. Each rotating pin 66a, 66b has an overall tapering form, so that the cross-section of each rotating pin decreases in the direction of the free end of the rotating pin, that is, of the side opposite the corresponding shoulder 74a, 74b. The maximum diameter Dmax (FIG. 7) is defined for each rotating pin as being the diameter of the cross-section of the pin where the latter is widest, which is at the base of the rotating pin next to the corresponding shoulder 74a, 74b.

Naturally the welding unit 48 includes drive motor means allowing the rotating pins 66a, 66b to rotate, and if appropriate allowing the shoulders 74a, 74b to rotate.

Figure 7:
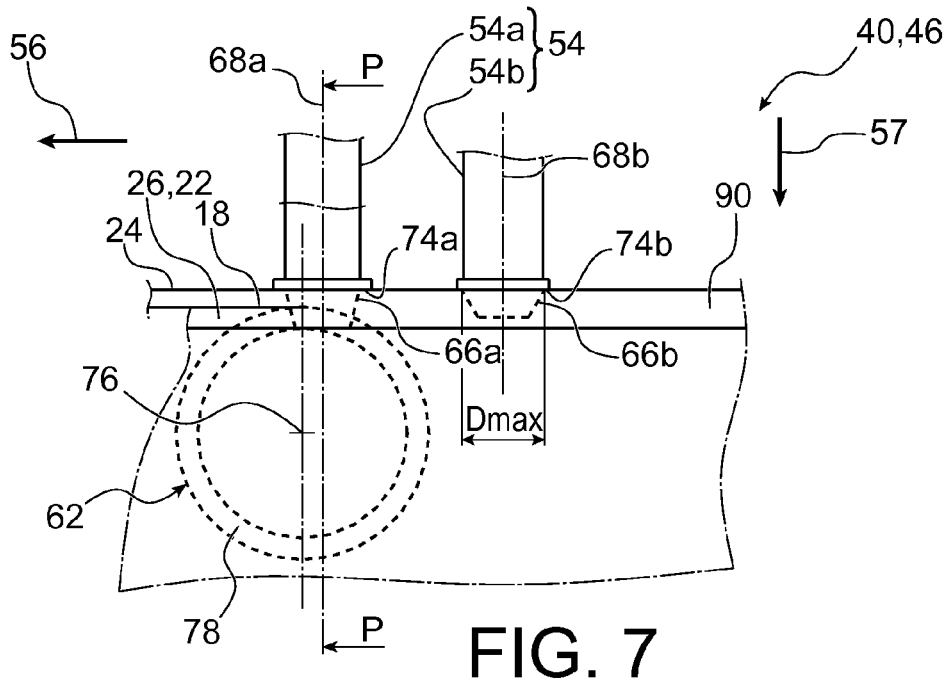
FIG. 7 is a diagrammatic view on a larger scale of a portion of FIG. 5 in section along plane VII-VII of FIG. 5.
Figure 8:
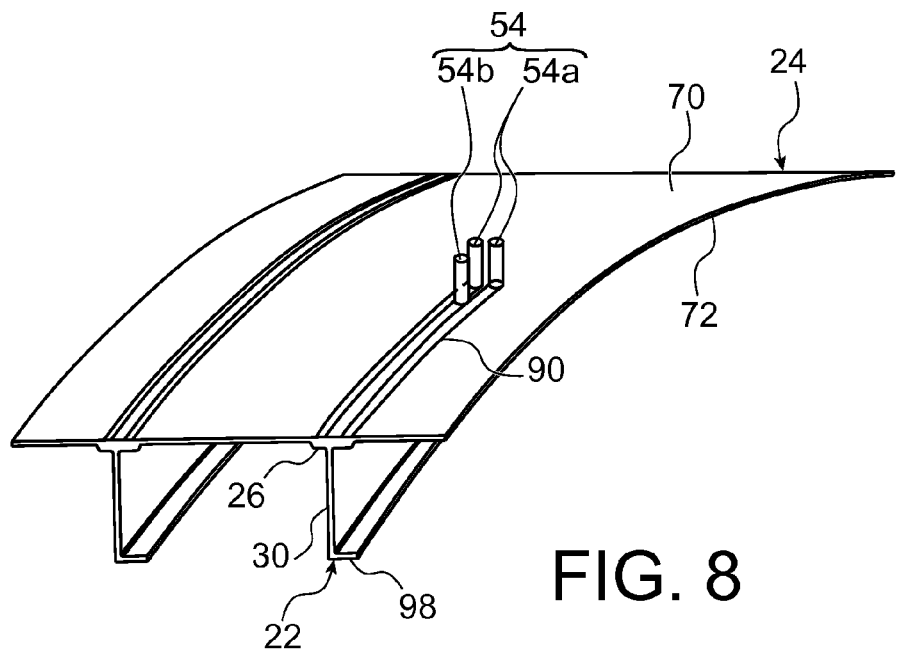
FIG. 8 is a partial perspective diagrammatic view of an aircraft fuselage panel and of two circumferential frames fixed to the former, showing the passage of welding heads on this panel.

The respective shoulders 74a, 74b of the aforementioned welding heads extend in the same plane. These shoulders 74a, 74b may thus be pressed simultaneously onto the external surface 70 of the fuselage panel 24, as FIGS. 6 and 7 show.

The respective rotating pins 66a of the lateral welding heads 54a have a height which is slightly less than the cumulative thickness of the fuselage panel 24 and of the flange 26 of the circumferential frame 22. The difference between the height of these rotating pins 66a and the cumulative thickness of the fuselage panel 24 and of the flange 26 is typically of the order of a few tenths of a millimeter, preferably between 0.2 and 0.5 mm. The term "height" of the rotating pins naturally refers to their length along their axis of rotation.

Furthermore the rotating pin 66b of the central welding head 54b has a height less than that of the respective rotating pins 66a of lateral welding heads 54a, but greater than the thickness of the fuselage panel 24. The difference in height between on the one hand the rotating pin 66b and on the other hand the rotating pins 66a is typically of the order of a few tenths of a millimeter, preferably between 0.2 mm and 0.5 mm.

In general terms the three rotating pins 66a, 66b are arranged so that the projection of the rotating pin 66b of the central welding head 54b, perpendicular to a plane P (FIG. 7) passing through the respective axes of rotations 68a of said respective rotating pins 66a of lateral welding heads 54a in the direction of the latter, intercepts these latter rotating pins 66a (FIG. 6). Furthermore, the width of the assembly formed by the three rotating pins 66a, 66b is substantially equal to the width of the flange 26 of the circumferential frame 22. This guarantees that the weld bead obtained using the welding unit manages to cover the entire width of the aforementioned flange 26, as will become clearer in what is to follow.

The FIG. 6 shows in addition an end part of each of the support arms 60, which includes the clamp roller 62 and the guide roller 64 carried by the support arm 60.

Each clamp roller 62 is fitted so that it rotates on the corresponding support arm 60 around an axis of rotation 76 which also forms an axis for a geometric revolution of the roller.

The clamp rollers 62 have respective side-walls 78 designed to be applied respectively against the two sides of the web 30 of the circumferential frame 22. In this way the web 30 of the circumferential frame 22 may be sandwiched between the respective side-walls 78 of clamp rollers 62 as shown in FIG. 6. To this end the robotic arm 58 of the counter-bearing unit 50 includes means for operating the support arms 60 which can cause each support arm 60 to move towards the other support arm 60 and thus move said clamp rollers 62 towards each other.

Each clamp roller 62 has in addition a main circumferential track 80 which is cylindrical in form and which revolves around the axis of rotation 76, extending from the side-wall 78 of the clamp roller 62 and designed to be pressed against the inner surface of the flange 26 of the circumferential frame 22, as shown in FIG. 6.

The side-wall 78 of each clamp roller 62 is connected to the corresponding main circumferential track 80 by a curved circumferential part 81 designed to fit against the curved surface which connects the corresponding side of the web 30 of the circumferential frame 22 to the flange 26 of the latter.

The respective main circumferential tracks 80 of the two clamp rollers 62 in combination form a support surface on the flange 26 of the circumferential frame 22, in the terminology belonging to the invention.

Furthermore each clamp roller 62 has a circumferential shoulder 82 which defines one end of the main circumferential track 80 of the clamp roller on the side facing the side-wall 78 of the latter. This circumferential shoulder 82 is connected to a secondary circumferential track 84 of the clamp roller which extends to an end face 85 of this clamp roller 62 defined on the side facing the side-wall 78 of the latter. The secondary circumferential track 84 is intended to be substantially in contact with the internal surface 72 of the fuselage panel 24 as shown in FIG. 6. To this end the circumferential shoulder 82 of each clamp roller 62 has a width that is substantially equal to the thickness of the flange 26 of the circumferential frame 22.

It should be noted that the main 80 and secondary 84 circumferential tracks of each clamp roller may be of a cylindrical or tapered form.

The clamp rollers 62 in addition include a cooling device. Each of these clamp rollers thus includes a substantially annular channel C1 centred on the axis of rotation 76 of the clamp roller 76, and has an end which is connected to an inlet channel C2 and an opposite end which is connected to an outlet channel (not shown in the figure). Said inlet and outlet channels open onto the end face 85 of the clamp roller and are respectively connected to a supply pipe C3 and to an outlet pipe (not shown in the figure) which are arranged in the corresponding support arm 60 and which are connected to a heat exchanger (not shown) used to cool the heat-transfer fluid.

Furthermore each guide roller 64 is fitted so that it can rotate around a respective axis of rotation 86 which is orthogonal to the axis of rotation 76 of the corresponding clamp roller 62.

Each guide roller 64 has a circumferential guide track 88 which is cylindrical in form and which revolves around the axis of rotation 86 of the guide roller 64, and which is designed to be pressed against a corresponding surface of the flange 30 of the circumferential frame 22.

The friction stir welding process used to weld a circumferential frame 22 onto a fuselage panel 24 using one of the welding systems 46 of the welding installation 40 will now be described in further detail, with reference to FIGS. 5 to 8.

This process firstly involves pre-positioning of the welding unit 48 and of the counter-bearing unit 50 of the welding system 46 facing a circumferential frame 22. If necessary this pre-positioning may be achieved by moving the welding system 46 of the welding installation 40 and/or by moving the support 42 carrying the circumferential frames 22 and the fuselage panel 24.

The process then involves positioning of the respective rotating pins 66a, 66b of the three welding heads 54a, 54b perpendicular to the flange 26 of the circumferential frame 22. Because of the layout of the three rotating pins 66a, 66b, the projection of the assembly formed by these three rotating pins in the penetration direction 57 then substantially intercepts the entire width of said flange 26. This positioning may be achieved by an operation of the robotic arm 52 of the welding unit 48.

The process then involves an operation of the welding unit 48, in particular of the robotic arm 52, so as to bring the free ends of the rotating pins 66a, 66b into contact with the external surface of the fuselage panel 24.

The process also includes positioning of each clamp roller 62 of the counter-bearing unit 50 so that the side-wall 78 of each clamp roller 62 is pressed against the web 30 of the circumferential frame 22 and so that the main circumferential track 80 of each clamp roller 62 is pressed against the flange 26 of the circumferential frame 22. In particular each clamp roller 62 is positioned such that its axis of rotation 76 is locally parallel to the fuselage panels 24 and orthogonal to the directions of welding 56 and of penetration 57. The positioning of the clamp rollers 62 may be achieved by operating the counter-bearing unit 50, in particular the robotic arm 58.

In this position of the clamp rollers 62, illustrated in FIG. 6, the axis of rotation 76 of each clamp roller 62 is orthogonal to the web 30 of the circumferential frame 22 whilst the axis of rotation 86 of each guide roller 64 is parallel to the aforementioned web 30. Furthermore the circumferential shoulder 82 of each clamp roller 62 is pressed against the lateral edge of the flange 26 of the circumferential frame 22 (FIG. 6) and the circumferential track 88 of each guide roller 64 is pressed against the web 30 of the circumferential frame 22.

In general terms the clamp rollers 62 are in addition placed facing the welding device 54. In the example shown the positioning of the clamp rollers 62 is such that each of the clamp rollers 62 is intercepted by the axis of rotation 68a of the rotating pin 66a of one of the lateral welding heads 54a (FIGS. 6 and 7). More specifically, the axis of revolution 76 of each of the clamp rollers 62 is offset slightly forwards in relation to the axis of rotation 68a of the corresponding rotating pin 66a, so that the projection of this axis of revolution 76 of each of the clamp rollers 62 in parallel to the axis of rotation 68a of said clamp roller nevertheless intercepts the latter.

The process involves making the rotating pins 66a, 66b rotate, and if appropriate making the associated shoulders 74a, 74b rotate, then inserting the rotating pins into the material which forms the fuselage panel 24 then also into the material forming the flange 26 of the circumferential frame 22. This insertion is made possible by local softening of the material, caused by the friction of the rotating pins, according to the well-known principle of friction stir welding.

The process then involves operating the welding unit 48, in particular the robotic arm 52, so that the welding heads 54a, 54b move along the circumferential frame 22, preferably in such a manner that the rotating pins 66a, 66b cover the entire flange 26 of this circumferential frame 22.

During the movement of the welding heads 54a, 54b, the rapid rotation of the rotating pins 66a, 66b produces, around each of these rotating pins, stirring of the locally softened material which forms the fuselage panel 24 as well as the flange 26. Because of the layout of the three rotating pins 66a, 66b, the region of stirred material extends from one lateral edge 32a to the other 32b of said flange 26. In the example shown the footprint of all three rotating pins 68a, 68b covers, in cross-section, the entire aforementioned flange 26 during movement of the welding heads 54a, 54b. It must be understood by this that this footprint extends from one lateral edge 32a to the other 32b of the flange 26. The term "footprint" should be understood to mean the mark that would be produced in the material by inserting the rotating pins 66a, 66b into this material independently of any stirring phenomena caused by the rotation of said pins.

In addition and still during the movement of the welding heads 54a, 54b, due to the limited height of the rotating pin 66b of the central welding head 54b as explained above, this latter rotating pin 66b does not reach the curved surfaces of the circumferential frame 22 which are respectively in contact with the respective curved circumferential parts 81 of the clamp rollers 62, and which respectively connect the faces of the web 30 of the circumferential frame 22 to the flange 26 of the latter. The integrity of these curved surfaces of the circumferential frame 22 can therefore be preserved.

Furthermore, the respective rotating pins 66a of the lateral welding heads 54a do not reach the respective main circumferential tracks 80 of the clamp rollers 62, due to the limited height of these rotating pins 66a, as explained above.

At the same time, the counter-bearing unit 50 is operated so as to achieve a rolling motion of the clamp rollers 62 over the internal surface of the flange 26 of the circumferential frame 22 and over the internal surface 72 of the fuselage panel 24, in a manner which is synchronised with the movement of the welding device 54, so that the clamp rollers 62 continuously exert a support substantially opposing the pressure exerted by the assembly of respective rotating pins 66a, 66b of the welding heads 54a, 54b as shown in FIG. 7.

The clamp rollers 62 in addition play a part in the confinement and conformation of the softened material by fitting against the section of the flange 26 of the circumferential frame 22. The circumferential shoulder 82 of each of the clamp rollers 62 is in particular used to retain the material on each side of said flange 26.

In combination with the movement of the clamp rollers 62, the guide rollers 64 respectively roll over both faces of the web 30 of the circumferential frame 22 and thus contribute to centring this circumferential frame 22 relative to the fuselage panel 24.

At the end of the welding process, after cooling, the material that was previously stirred regains its rigidity and forms a weld bead 90 (FIG. 8) which provides full cohesion between the flange 26 of the circumferential frame 22 and the fuselage panel 24. This weld bead 90 corresponds to the region of material that was previously stirred and therefore covers the entire width of the flange 26 of the circumferential frame 22.

The process described above corresponds to the work of one of the welding systems 46 in the installation 40. Naturally the other welding systems 46 can carry out the same process in parallel.

It should be noted that the process described above can also be applied to the welding of a circumferential frame simultaneously onto two adjacent fuselage panels. In this case the process jointly carries out butt welding of the two adjacent panels and transparency welding of the circumferential frame onto the adjacent ends of said panels.

Figure 9:
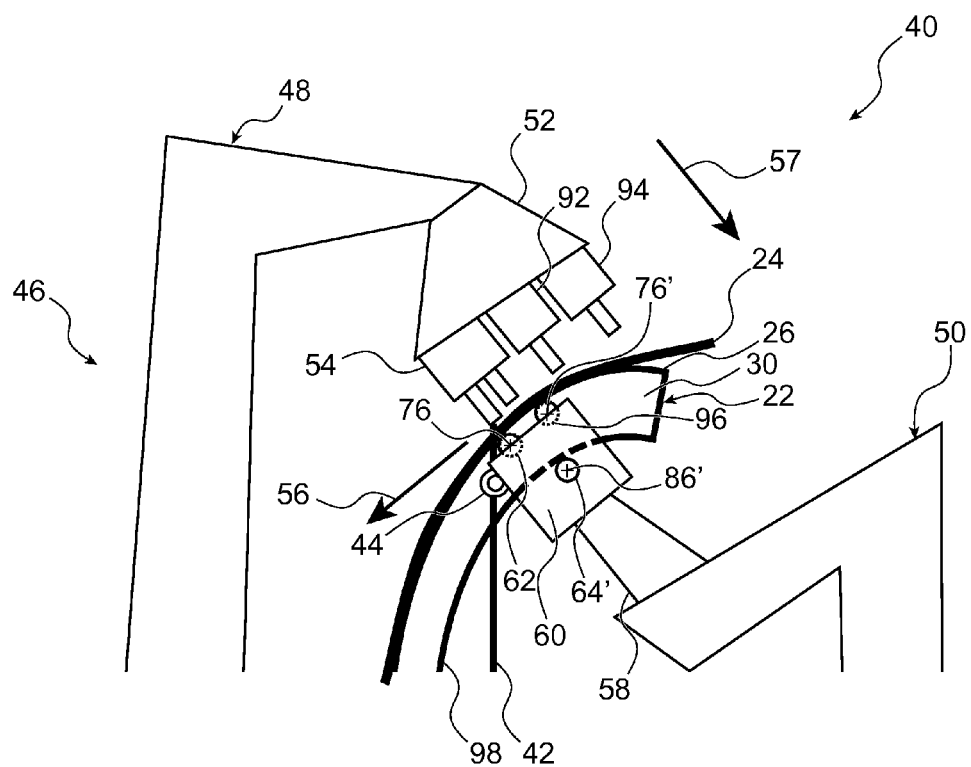
FIG. 9 is a partial diagrammatic side view of a welding installation which includes a welding system according to another embodiment of the invention.

FIG. 9 shows a welding system 46 according to another embodiment of the invention, wherein the welding unit 48 includes in addition a non-destructive inspection device 92 as well as an anti-corrosion treatment device 94 which are carried by the robotic arm 52 and which may each be of a conventional type. The non-destructive inspection device 92 is, for example, an ultrasound inspection device.

During the implementation of the welding process, the welding unit is positioned so that the non-destructive inspection device 92 is arranged so that there is a delay, that is to say, it is to the rear in relation to the welding device 54 and in such a way that the anti-corrosion treatment device 94 is arranged so that there is a delay, that is to say it is to the rear in relation to the non-destructive inspection device 92, allowing for the direction of welding 56.

In this way the non-destructive inspection device 92 is used to inspect the quality of the weld bead 90 automatically and immediately after it is formed.

In the event of a defect being detected, the welding process then includes a reverse motion of the welding device 54, then a re-work of the weld starting from the defect zone of the weld bead 90.

Furthermore the anti-corrosion treatment device 94 can be used to apply an anti-corrosion treatment onto the external surface of the fuselage panel 24 at the weld bead 90, immediately after the quality inspection by the latter when the inspection reveals no defects.

Alternatively or in a complementary manner a non-destructive inspection device and/or an anti-corrosion device may be fitted to the robotic arm 58 of the counter-bearing unit 50 in order to act on the flange 26 of the circumferential frame 22.

In addition, the example in FIG. 9 shows another configuration of clamp rollers and of guide rollers.

In effect the counter-bearing unit 50 in FIG. 9 includes not only the two clamp rollers 62 described above but also two additional clamp rollers 96 arranged to the rear of the clamp rollers 62, allowing for the direction of welding 56, and which are similar to the latter. These additional clamp rollers 96 are also pressed against the internal surface of the flange 26 of the circumferential frame 22.

The counter-bearing unit 50 includes two guide rollers 64' whose axes of rotation 86' are parallel to the respective axes of rotation 76 and 76' of the clamp rollers 62 and 96. These guide rollers 64' are pressed onto the internal surface of the runner 98 of the circumferential frame 22. It should be noted that this runner 98 can be seen more clearly in FIGS. 6 and 8.

Figure 10:
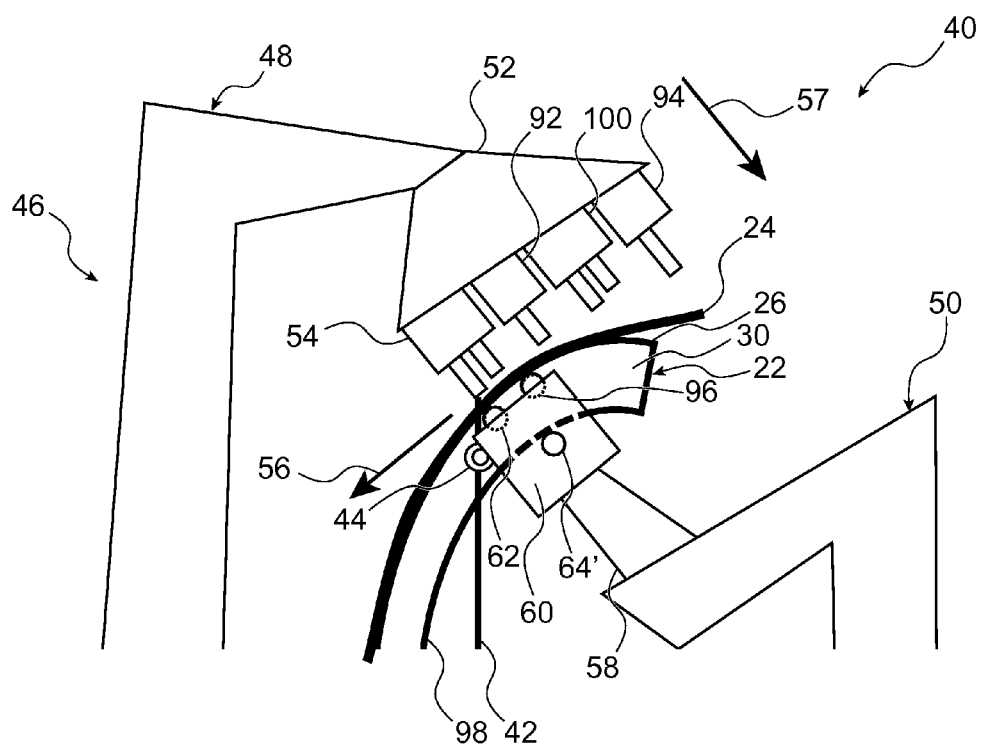
FIG. 10 is a partial diagrammatic side view of a welding installation which includes a welding system according to yet another embodiment of the invention.

Furthermore, in another embodiment of the invention shown in FIG. 10, the welding unit 48 in addition includes a repair device formed by a second welding device 100, preferably similar to the welding device 54 described above, but arranged between the non-destructive inspection device 92 and the anti-corrosion treatment device 94.

This second welding device 100 is kept inactive as long as the non-destructive inspection device 92 does not detect any defect, and is activated following the detection of any defect. In this case the process then includes re-work of the weld in the defect zone of the weld-bead 90 by means of the second welding device 100. At the end of this re-work of the defect zone, the process continues normally using the welding device 54.

The second welding device 100 thus avoids any reverse motion of the welding device 54 in the event of a defect being detected in the weld bead 90 by means of the non-destructive inspection device 92. This makes the welding process even more rapid.

In the preceding description, an example of the welding process according to the invention and of an installation allowing this process to be implemented have been described as far as the welding of a circumferential frame onto an aircraft fuselage panel is concerned.

It should be noted that the invention can be applied to the welding of other parts, in particular to the welding of longitudinal stiffeners, spars or cross-members.

The invention claimed is:

1. A method for linear transparency friction stir welding of a flange of a stiffener, which comprises a web oriented transverse to the flange, onto at least one panel for an aircraft, the method comprising:
    making a weld bead along a direction of welding along a first surface, which is a longitudinally or circumferentially extending surface of the flange of the stiffener applied onto the at least one panel, by using at least one rotating pin,
    wherein a width of the first surface, taken orthogonally to the direction of welding, is greater than a maximum diameter of the at least one rotating pin,
    wherein the weld bead extends continuously in cross-section across an entire width of the flange, from a first outer lateral edge to a second outer lateral edge of the first surface,
    wherein the first outer lateral edge and the second outer lateral edge of the first surface are located on opposite outer lateral edges of the flange with respect to the width of the first surface, and
    wherein no gap is present in the weld bead and flange from the first outer lateral edge to the second outer lateral edge.

2. The method according to claim 1, wherein the width of the first surface, taken orthogonally to the direction of welding, is greater than double the maximum diameter of each of the at least one rotating pin.

3. The method according to claim 1, further comprising using a welding system comprising a plurality of welding heads, each of which includes a rotating pin and a shoulder that extends from a base of each rotating pin, and a counter-bearing unit including a support surface;
    inserting a respective rotating pin of each of the plurality of welding heads into the panel and into the flange of the stiffener;
    moving the plurality of welding heads along the flange of the stiffener in the direction of welding by local softening of material forming the panel and of material forming the flange of the stiffener, wherein the local softening is caused by heat produced by friction generated by the respective rotating pin of each of the plurality of welding heads; and
    pressing the support surface of the counter-bearing unit onto the flange of the stiffener to counteract pressure exerted by the respective rotating pin of each of the plurality of welding heads.

4. The method according to claim 3, wherein the respective rotating pin of each of the plurality of welding heads is mutually offset in a transverse direction, which is orthogonal to the direction of welding and to respective axes of rotation of each rotating pin.

5. The method according to claim 3, wherein a footprint formed by an assembly of the respective rotating pin of each of the plurality of welding heads substantially extends in cross-section from the first outer lateral edge to the second outer lateral edge of the flange of the stiffener.

6. The method according to claim 3, wherein the plurality of welding heads comprises three welding heads that are arranged according to a triangular configuration.

7. The method according to claim 6, wherein the three welding heads comprise two lateral welding heads, which are centered in relation to a plane orthogonal to the direction of welding, and a central welding head, which is offset in the direction of welding in relation to each of the lateral welding heads.

8. The method according to claim 7, wherein a first of the three welding heads is positioned facing the web of the stiffener and the other two welding heads are offset in relation to the web of the stiffener, and wherein a penetration depth of the rotating pin of the first welding head into the flange is less than a penetration depth of the respective rotating pin of others of the three welding heads into the flange.

9. The method according to claim 8, wherein the first welding head is the central welding head.

10. The method according to claim 7, wherein the three welding heads move in a direction such that the central welding head is arranged at a rear of the two lateral welding heads.

11. The method according to claim 3, wherein the support surface is formed jointly by two rollers, which are carried by the counter-bearing unit and which move by rolling against the flange.

\* \* \* \* \*